Jan. 7, 1958 R. B. HANER, JR 2,819,410
POWER SUPPLY FOR CENTRALIZED TRAFFIC CONTROL SYSTEM
Filed April 7, 1953

INVENTOR.
R.B. HANER, JR.
BY
Forest B. Hitchcock
HIS ATTORNEY

United States Patent Office 2,819,410

Patented Jan. 7, 1958

2,819,410

POWER SUPPLY FOR CENTRALIZED TRAFFIC CONTROL SYSTEM

Robert B. Haner, Jr., Scottsville, N. Y., assignor to General Railway Signal Company, Rochester, N. Y.

Application April 7, 1953, Serial No. 347,253

8 Claims. (Cl. 307—31)

Figure 1:
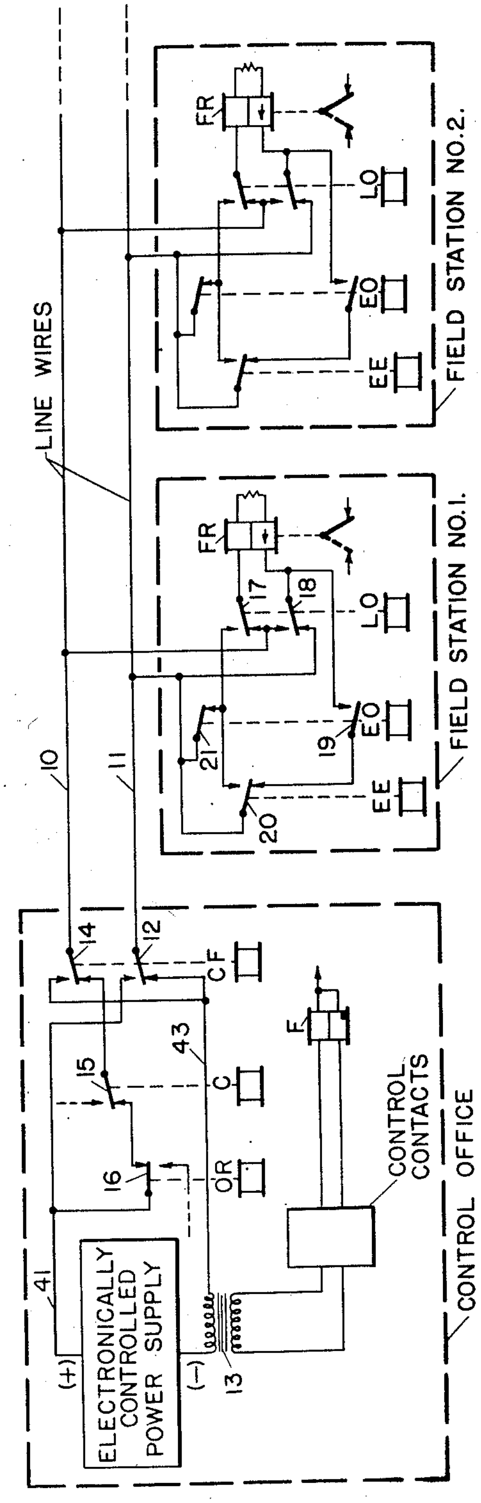

This invention relates to centralized traffic control systems for railroads and more particularly pertains to an electronic power supply for energizing the line wires in a centralized traffic control system.

In centralized traffic control systems, the control of switches, signals, and other devices at remote field station locations is accomplished from a central location, usually termed a control office, by transmitting distinctively coded electrical currents over a pair of line wires from the control office to the various field stations. Information regarding the actual operated conditions of the various devices at each field station, or an "indication" as it is commonly called, is generally transmitted over the same line wires carrying the controls, and these indications are also usually transmitted in the form of distinctively coded electrical currents.

In one such type of centralized traffic control system, a continuous pair of line wires extends from the control office to the various field stations. At the control office, a power source, usually a battery, is provided for energizing the line wires along with apparatus for causing the line energization to be distinctively coded for the transmission of control codes. At each field station, a line relay is connected across the line wires, and this line relay responds to the distinctively coded currents placed on the line wires at the control office. Apparatus is also provided at each field station to intermittently shunt the normally energized line wires in a distinctive code pattern according to the particular indication codes that are desired to be transmitted back to the control office. Each shunting of the line wires at the field station causes an increase of line current between the control office and the transmitting field station, and apparatus is provided at the control office for detecting these current variations so as to make it possible for the incoming messages from the field stations to be properly received.

The characteristics of a power supply system comprising a battery, as is normally used in such shunt type centralized traffic control systems, are such that it is, under certain circumstances, difficult to receive indications from remote field station locations. This difficulty arises partly from the fact that a current limiting resistor is required to be inserted in series with the battery at the control office. This current limiting resistor is required to limit the line current to a value that will prevent damage to relay contacts when a shunt is applied across the line wires at or near the control office since, under these circumstances, the low line resistance between the battery and the shunt would otherwise cause an extremely high level of current.

The use of a current limiting resistor in series with the line battery causes, however, a reduction in the voltage applied to the line wires whenever the line is shunted at a field station. In other words, the reduced resistance load across the line wires that occurs when a shunt is applied causes the current drawn from the battery to increase. The increased voltage drop that then results across the current limiting resistor and also the battery's internal resistance causes the line voltage to drop with the result that only a limited current increase is produced by the field station shunt. Consequently, for remote field stations where there is in addition a considerable voltage drop in the line wires when a shunt is applied, the current differential at the control office becomes so small that its detection is difficult.

It is an object of this invention to overcome these drawbacks of the battery power supply by providing a power supply for a centralized traffic control system of the kind described having characteristics to cause a greater line current differential between shunted and unshunted conditions even for remote field station locations and thereby facilitate the reception of indication codes from such remote locations.

Another object is to provide an electronically controlled power supply for a centralized traffic control system that is effective to apply a constant voltage to the line wires at the control office under both shunt and nonshunt conditions and also for wide variations in line linkage resistance and which is yet effective to limit the maximum current that can flow in the event that a shunt is applied at or near the control office.

Other objects, purposes, and characteristic features of this invention will in part be obvious from the accompanying drawings and in part pointed out as the description of the invention progresses.

Figure 2:
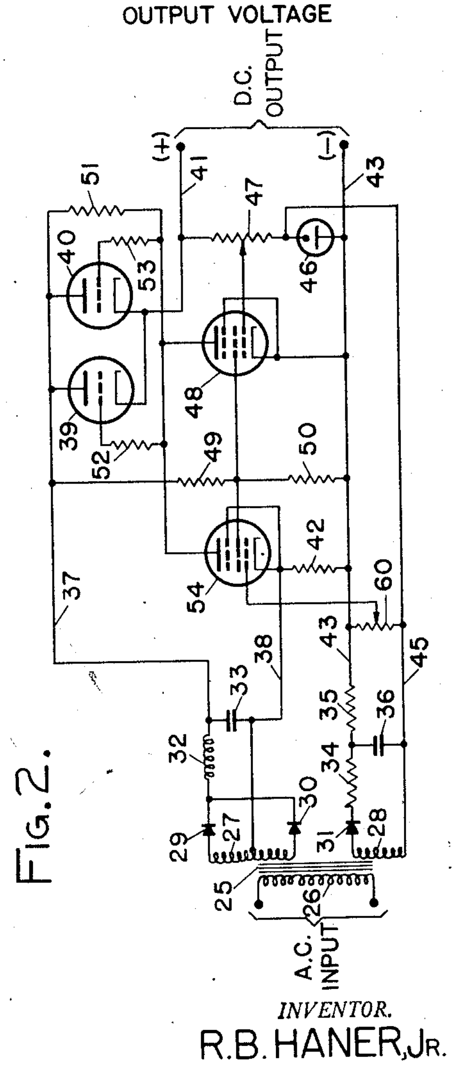
Figure 3:
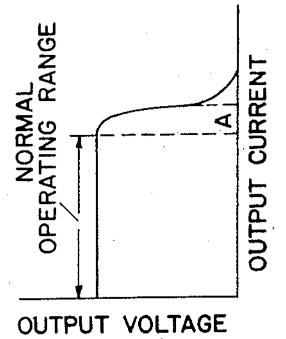

In describing this invention in detail, reference will be made to the accompanying drawings in which like reference characters designate corresponding parts in the several views, and in which:

Fig. 1 diagrammatically illustrates the line circuit of a shunt type centralized traffic control system comprising the electronically controlled power supply of the present invention;

Fig. 2 is a circuit drawing of one embodiment of the electronically controlled power supply of the present invention; and Fig. 3 graphically illustrates certain distinctive features of the power supply circuit organization of Fig. 2.

To simplify the illustration and facilitate the explanation of this invention, the various parts and circuits are shown diagrammatically and conventional illustrations have been used. The drawings have been made to make it easy to understand the principles and manner of operation rather than to illustrate the specific construction and arrangement of parts that would be used in practice. The various relays and their contacts, for example, are shown in a conventional manner.

Described briefly, the present invention comprises a power supply that is electronically controlled and is particulary adapted for use in energizing the line wires of a centralized traffic control system. The circuit organization is effective to cause the output voltage of the power supply to be substantially unaffected by variations of load caused by line shunts and is also effective to limit the maximum current that can be drawn from the power supply. Thus, it may be considered that the electronically controlled power supply system of the present invention is a constant voltage source of power for a preselected range of output current and then becomes a constant current source of power when the load on the power supply is increased beyond the normal range.

Fig. 1 diagrammatically illustrates the line circuit for a centralized traffic control system of the kind that may be used in conjunction with the power supply system of this invention. A shunt type centralized traffic control system of this kind is shown in detail in the Pat. No. 2,399,734 to W. D. Hailes et al., dated May 7, 1946. The line circuit of Fig. 1 is a simplification of that shown in Fig. 1 of this patent and corresponds essentially to that shown in the publication "Centralized Traffic Control," Handbook 30, copyrighted in September 1948 by the General Railway Signal Co.

At the control office, control codes are applied to the line wires 10 and 11 and are transmitted to a plurality of field stations, each of which is located along the railroad at a point where switches, signals, or other devices are to be controlled. Each field station comprises means for responding to a control code designated for it and is effective to decode the information received so as to selectively control the devices at that field station location in the required manner.

Each field station also comprises means for selectively shunting and unshunting the line wires. Since the line wires are normally energized by the power supply provided at the control office, the act of shunting and unshunting the line wires at a field station causes code pulses of current to appear on the line wires. In this way, indication codes bearing information as to the operated conditions of the various devices at the field station are transmitted back to the control office.

Only that portion of the line circuit that is required to obtain an understanding of the principles of the present invention is shown in Fig. 1. Reference may be made to the above mentioned Hailes et al. patent for a more complete disclosure of such line circuit. Also, more than two field stations as shown in Fig. 1 may be included in practice.

In Fig. 1, it is shown that the line wire 11 is normally connected through a back contact 12 of the relay CF and through the primary winding of the pulse transformer 13 to the negative terminal of the electronically controlled power supply. The other line wire 10 is connected through back contact 14 of relay CF, back contact 15 of relay C, and front contact 16 of relay OR to the positive terminal of the power supply. Thus, when the system is at rest, the power supply is connected across the line wires so that the line wires are normally energized.

At each field station, the LO relay is dropped away during a period of rest. Line wire 10 is thus connected through back contact 17 of relay LO, the upper winding of relay FR and back contact 18 of relay LO, to the line wire 11. The FR relay at each field station is a two-position polar relay. During a period of rest, when the flow of current through the upper winding of relay FR is from left to right, the armature of this relay assumes its right-hand position. If the polarity of current through this upper winding of relay FR is either interrupted or reversed, the armature of relay FR moves to its left-hand position.

Means are provided at the control office to cause line wires 10 and 11 to be alternately energized and deenergized during a control cycle. As a result, the line relay FR at each field station is successively operated between its opposite conditions.

At the beginning of an indication cycle, the relay CF at the control office is picked up in response to the beginning of an indication code at any field station. Line wire 10 is, therefore, connected through front contact 14 of relay CF and through the primary winding of the pulse transformer 13 to the negative terminal of the power supply; whereas, the line wire 11 is connected through front contact 12 of relay CF directly to the positive output terminal of the power supply. This reversal of polarity of the line wires results in actuation of the relay FR at each field station so that the relay LO at the transmitting field station is picked up in a manner described in the above mentioned patent to H. D. Hailes et al. The picking up of the relay LO at any field station designates that field station as the one to transmit an indication code to the control office.

When the relay LO at a field station is picked up, the subsequent intermittent operation of the relay EO causes a shunt to be applied across the line wires 10 and 11. This shunt circuit extends from line wire 10, and includes front contact 18 of relay LO, front contact 19 of relay EO, and back contact 20 of relay EE, to the line wire 11. At the same time, relay FR at the transmitting field station is dropped away because of the shunt applied at that location, and also because of the opening of back contact 21 of relay EO which is included in the pick-up circuit of relay FR when relay LO is picked up.

Each code digit characterized by the shunting of the line wires is terminated by the picking up of relay EE. The picking up of relay EE causes its back contact 20 to open so that the shunt path just described is no longer effective. At the same time, the closure of front contact 20 of relay EE causes the line wires to be connected across the upper winding of the line relay FR. This circuit for the energization of relay FR extends from the now positive line wire 11 and includes front contact 20 of relay EE, front contact 17 of relay LO, both windings of relay FR in series, and front contact 18 of relay EE to the negative line wire 10 Thus, it is seen that the shunting of the line wires at the field station causes the associated line relay to drop away, but that the removal of the shunt causes the energized line wires to pick up the line relay at that location. In this way, the line relay follows the code transmitted from the field station to thereby allow a local stepping operation.

At the control office, each current change in the line wires occurring in response to a coded message applied to the line wires inductively affects the primary winding of pulse transformer 13. The voltage appearing by transformer action in the secondary winding of this pulse transformer is effective, as diagrammatically illustrated in Fig. 1, to operate the relay F between its opposite conditions. The relay F is a two-position polar magnetic stick type. Its armature is operated to one position by a particular polarity of energization and to the other position by the opposite polarity, remaining in its last actuated position when energy is removed.

When the system is at rest, the load on the power supply at the control office includes principally the series resistance of the line wires, the leakage resistance, and the various line relays shunting the line, one of which is located at each field station.

When a shunt is applied near the control office, the total resistance across the line wires as seen at the control office location may be very low so that the current drawn from the power supply increases greatly. It is thus required that means be provided to limit the maximum current that can be drawn from the power supply so as to prevent damaging relay contacts at the control office location. When the shunt is applied at a location remote from the control office, however, the reduction in resistance across the line wires as seen at the control office may be only slight because there is between the control office and the shunt location still considerable line and leakage resistance in addition to a plurality of line relays at the various field stations. Thus, a shunt at a remote location produces a substantially smaller current differential than does a shunt applied near the control office. It is for this reason highly desirable that the output voltage of the power supply energizing the line wires be properly regulated to maintain the voltage at the proper level even when the total line resistance is reduced under shunting conditions. In this way an increased current differential occurs at the control office between shunt and non-shunt conditions to facilitate the reception of indication codes.

Referring to the circuit diagram of Fig. 2 showing the electronically controlled power supply of the present invention, it is seen that the power supply includes a power transformer 25 whose primary winding 26 is connected to a source of alternating current power. A high voltage secondary winding 27 is provided as well as a lower voltage secondary winding 28 which is used principally to provide a source of negative bias voltage.

Full-wave rectification of the voltage appearing across the secondary winding 27 is provided by the rectifiers 29 and 30 which may be of any suitable kind such as selenium rectifiers. A similar rectifier 31 is associated with the winding 28 to provide half-wave rectification of the alternating voltage appearing across the terminals of this winding. The filtering means associated with the high voltage rectified supply includes the inductor 32 and filter capacitor 33. Resistors 34 and 35 and the filter capacitor 36 provide the desired filtering with respect to the rectified output of secondary winding 28.

The polarity of the rectifiers 29 and 30 is so selected that the wire 37 is of positive polarity with respect to the wire 38. Wire 37 is connected through the plate-cathode circuit of the parallel operated triode tubes 39 and 40 to the wire 41 shown also in Fig. 1. Wire 38 is connected through resistor 42 to the wire 43 which also is shown in Fig. 1.

The resistance offered by the plate-cathode circuits of the tubes 39 and 40 causes a proportionate voltage drop to appear between the wire 37 and the wire 41. As will be shown, the circuit means associated with the tubes 39 and 40 causes the plate-cathode resistance of these tubes to vary in accordance with the tendency of the output voltage to vary from its preselected level. In this way, the variable voltage drop appearing across the plate-cathode circuits of the tubes 39 and 40 causes the voltage between wires 41 and 43 to remain substantially constant.

The polarity of rectifier 31 associated with the transformer secondary winding 28 is of such polarity that wire 45 assumes a negative polarity with respect to wire 43. Voltage regulator tube 46 is connected between the wires 45 and 43 and is, consequently, effective to maintain a fixed difference of potential between the wires 43 and 45. In one particular embodiment of this invention, the voltage regulator tube 46 was selected to provide a uniform 105 volts between the wires 43 and 45.

The output voltage of the power supply appearing between wires 41 and 43 appears across the series combination of potentiometer 47 and the voltage regulator tube 46. For a preselected level of output voltage, the tap on the potentiometer 47 is adjusted to cause the positive voltage between the tap and the cathode of the voltage regulator tube 46 to nearly balance the negative voltage appearing between the cathode of the voltage regulator tube 46 and wire 43. Under these circumstances, the portion of the output voltage selected by the position of the tap on potentiometer 47 almost counterbalances the fixed voltage appearing across the voltage regulator tube 46, and this results in a grid-cathode voltage for tube 48 which is slightly negative and provides the desired operating bias for the tube 48.

Tube 48 is preferably a high gain pentode tube. Its suppressor grid is connected to its cathode, and its screen grid is connected to the junction of resistors 49 and 50 connected between wires 37 and 43 to provide the desired screen grid voltage for the tube. The plate of tube 48 is connected through resistor 51 to wire 37. A connection is also made from the plate of tube 48 to the control grids of tubes 39 and 40 through the respective grid leak resistors 52 and 53.

Under normal operating conditions when only a moderate amount of current is being drawn from the power supply over wires 41 and 43, there is only a relatively small voltage drop across resistor 42 in the cathode circuit of tube 54. The direction of this current flow in resistor 42 is such as to cause the cathode of tube 54 to become negative with respect to wire 43. The connection of the grid of this tube 54 to a tap on the potentiometer 60 connected between wires 43 and 45 is made so as to cause the grid to be substantially negative with respect to wire 43. Consequently, under the conditions whereby there is only a relatively small current flow through resistor 42, the control grid of tube 54 is sufficiently below the potential of the cathode to cut this tube off.

Under the conditions previously mentioned, a normal operating bias is chosen for tube 48 by the position of the tap on potentiometer 47 in accordance with the desired output voltage. The resulting conduction of plate current for tube 48 through resistor 51 reduces the plate voltage of tube 48 to a level that provides a slight negative voltage for the control grids of tubes 39 and 40 with respect to their cathodes. This grid-cathode voltage level results in a corresponding value of plate-cathode resistance for these tubes which determines the voltage drop that appears across them. A condition of stability is thus arrived at under which the output voltage level regulates the level of conduction of tube 48, which controls the grid bias of tubes 39 and 40, which in turn controls the voltage drop across these tubes and thus the output voltage of the power supply.

In the event that the output voltage should decrease, the grid voltage of tube 48 will similarly decrease because there is now a smaller voltage obtainable from the output to counteract the negative voltage appearing across the voltage regulator tube 46. Tube 48 conducts less plate current, therefore, and the reduced amount of plate current flow through resistor 51 causes the grid voltages of tubes 39 and 40 to increase. The plate-cathode resistance of tubes 39 and 40 is reduced with a corresponding reduction in the voltage drop across these tubes so that the line voltage appearing between wires 41 and 43 increases toward its previous value until a condition of stability is again arrived at.

If the output voltage increases, the grid voltage of tube 48 becomes less negative so that tube 48 conducts more plate current. The increased voltage drop across resistor 51 causes the grid voltages of tubes 39 and 40 to decrease so that these tubes conduct less plate current. The plate-cathode resistance of these tubes is thereby increased so that the output voltage appearing between wires 41 and 43 is reduced toward its previous value until once more a condition of stability is reached. In this way, the tendency of the output voltage to vary is automatically corrected so as to keep the output voltage at a substantially constant level.

For the normal range of output current of the power supply, the voltage drop across resistor 42 remains sufficiently low with respect to the negative grid voltage as selected by potentiometer 60 so that tube 54 remains cut off. However, when the output current exceeds a preselected level the increased voltage drop across resistor 42 causes the cathode of this tube 54 to be so reduced in voltage with respect to wire 43 that tube 54 cannot remain cut off. The plate current of tube 54 also passes through the resistor 51 and the increased voltage drop across resistor 51 causes a reduction in grid voltage for tubes 39 and 40. The increase of plate-cathode resistance for these tubes that results causes the output voltage appearing between wires 41 and 43 to decrease. The effect of increased line current in lowering the cathode voltage of tube 54 is more pronounced and more effective to lower the output voltage of the power supply than is the effect of this lowered output voltage on tube 48 which normally tends to maintain the output voltage at the preselected level. Consequently, when the output current exceeds the preselected high valve, the control of output voltage level is exercised almost entirely by tube 54. With further increases in output current, tube 54 conducts more and more plate current so that the output voltage of the power supply decreases rapidly as graphically illustrated in Fig. 3.

In one embodiment of this invention, it was found that the tube 54 had become fully conductive when the output current had reached a relatively high value such as illustrated by point A of Fig. 3. With tube 54 fully conductive at this point, further increases of load can no longer produce any effect on the conduction of tubes 39 and 40. Further decreases of output voltage still occur as the output current tends to increase beyond point A, however, because of the increased voltage drop across resistor 42, and this effect is also illustrated in Fig. 3.

As shown in Fig. 3, the normal operating range of line current variation as caused by variations in line leakage and by the application of line shunts does not result in a line current exceeding the predetermined upper value as selected by the position of the tap on potentiometer 60. The current limiting characteristic of the power supply is ordinarily, therefore, not brought into play. If a line shunt is applied at or near the control office, however, so that the line current tends to rise above the limiting value, then the output voltage is reduced to prevent such excessive amount. The result is that more than a preselected maximum current cannot be drawn from this power supply, and there is thus no danger of damaging contacts of relays or other apparatus in the control office.

Although the electronically controlled power supply system of this invention has been described and shown particularly with reference to a shunt-type centralized traffic control system, the principles of this invention apply equally well to any kind of direct-current code communication system. When applied to such systems, a power supply system constructed according to the principles of this invention is particularly effective in maintaining a constant voltage on the line wires despite wide variations in leakage resistance which ordinarily cause the current drawn from the power supply and thus the voltage applied to the line wires to vary over a relatively wide range.

Having described an electronically controlled power supply as one specific embodiment of this invention, I wish it to be understood that this form is selected to facilitate in the description of the invention, and that further modifications, and alterations may be made in the specific form shown to meet the requirements of practice without in any manner departing from the spirit or scope of this invention.

What I claim is:

1. In a line shunt type of direct current code communication system, a pair of line wires connecting a control office to a plurality of field stations, power supply circuit means at said control office to energize said line wires, means at each field station for selectively shunting said line wires to thereby form a distinctive line code, said power supply circuit means supplying a constant voltage to said line wires with varying levels of direct current supplied to said line wires provided said direct current level is below a preselected value, said power supply circuit means causing a decreasing voltage to be applied to said line wires in response to an increase of load tending to cause said line current to increase beyond said preselected value, said decreasing voltage characteristic tending to prevent said line current from exceeding said preselected value.

2. In a line shunt type of centralized traffic control system, a pair of line wires connecting a control office to a plurality of field stations, power supply circuit means at said control office for energizing said line wires, means at each field station for selectively shunting said line wires to thereby cause a pulsating direct current in said line wires for the transmission of coded indications to said control office, said power supply circuit means supplying a constant voltage to said line wires with varying level of direct current supplied to said line wires provided said direct current is below a preselected value, said power supply circuit means causing a decreasing voltage to be applied to said line wires in response to an increase of load tending to cause said line current to increase beyond a preselected value, said decreasing voltage characteristic being effective to limit said line current to substantially said preselected value with an increase of load to thereby prevent damage to apparatus at said control office.

3. In a centralized traffic control system, a pair of line wires connecting a control office to a plurality of field stations, power supply means at said control office to energize said line wires, circuit means at each field station for selectively shunting said line wires to thereby cause the transmission of coded pulses of line current between said field station and said control office, said power supply means supplying a substantially constant voltage to said line wires provided said line current is below a preselected value and supplying a substantially constant current to said line wires for greater line loads tending to cause said line current to increase beyond said preselected value, said constant voltage characteristic causing a greater current differential in said line wires when a shunt is applied at one of said field stations thereby resulting in a greater amplitude for said coded pulses of direct current, said constant current characteristic limiting the maximum current flow in said line wires to prevent damage to said apparatus.

4. In a shunt type centralized traffic control system, a power supply system for energizing the line wires connecting a control office to a plurality of field stations comprising, a source of direct-current voltage, an electron discharge tube having a control grid and with its plate-cathode circuit connected in series with said source of voltage, first circuit means responsive to the voltage applied to said line wires for controlling the negative grid-cathode bias voltage of said electron tube so as to vary the plate-cathode resistance of said tube, said first circuit means causing an increase in said negative grid bias in response to an increase in said voltage applied to said line wires and causing a decrease in said negative bias voltage in response to a decrease in said voltage applied to said line wires, second circuit means responsive to the current flowing in said line wires and becoming effective when said line current increases beyond a preselected value to increase the bias voltage on said tube to thereby limit the maximum current drawn from said power supply.

5. In a shunt type centralized traffic control system for railroads, a power supply for energizing the line wires connecting a control office to a plurality of field stations comprising, a source of direct-current voltage, a first electron discharge tube with its plate-cathode circuit connected in series with said source of voltage, circuit means responsive to the voltage applied to said line wires to increase the plate-cathode resistance of said tube in response to an increase in said line wire voltage and to decrease said plate-cathode resistance in response to a decrease in said line wire voltage to thereby maintain said line wire voltage substantially constant, a resistor included in series with said source of direct-current voltage, a second electron discharge tube being normally biased to a nonconductive condition and having said resistor included in its cathode circuit, means responsive to the voltage appearing across said resistor for making said second tube conductive when the level of line current through said resistor tends to exceed a predetermined maximum value, circuit means responsive to the conductive condition of said second electron tube to increase the plate-cathode resistance of said first tube to thereby cause the output voltage applied to said line wires to decrease and prevent said current from increasing to an undesired high level.

6. In a centralized traffic control system, a pair of line wires connecting a control office to a plurality of field stations, a power supply for energizing said line wires comprising, a source of direct-current voltage, a first electron discharge tube having its plate-cathode circuit connected in series with said source of direct-current voltage, means responsive to variations in the voltage applied to said line wires for varying the plate-cathode resistance of said first tube in a direction to tend to restore said voltage to its predetermined value, a resistor connected in series with said source of direct-current voltage, a second electron discharge tube being normally biased to cutoff but becoming conductive in response to the voltage developed across said resistor when said line current exceeds a preselected value, means responsive to the conductive condition of said second tube to increase the plate-cathode resistance of said first tube to thereby decrease the voltage applied to said line wires and prevent the rise of said line current substantially above said preselected value.

7. In a centralized traffic control system for railroads, a control office and a plurality of field stations connected by a pair of line wires, a power supply for energizing said line wires comprising, a source of direct-current voltage, a voltage control electron discharge tube having a control grid and with its plate-cathode circuit connected in series with said source of direct-current voltage, a voltage responsive electron discharge tube, means for applying to the grid-cathode circuit of said voltage responsive tube a fixed negative voltage and also a portion of the positive output voltage applied by said power supply to said line wires to thereby provide a negative bias voltage for said voltage responsive tube varying in accordance with the level of said output voltage, a load resistor connecting the plate of said voltage responsive tube to the plate of said voltage control tube, a current responsive electron discharge tube, a resistor connected in series with said source of direct-current voltage and being included in the cathode circuit of said current responsive tube, circuit means for biasing the grid of said current responsive tube beyond cutoff, said cathode of said current responsive tube becoming increasingly negative in voltage with increasing current through said resistor to thereby cause said current responsive tube to become conductive when said current level reaches a predetermined value, said plate of said current responsivie tube being connected to the plate of said voltage responsive tube, said control grid of said voltage control tube being connected through a grid leak resistor to said plates of said current responsive and said voltage responsive tubes, whereby said voltage applied to said line wires remains substantially constant provided the current supplied to said line wires remains below said predetermined value and said voltage applied to said line wires decreases when said current applied to said line wires tends to exceed said predetermined value.

8. In a line shunt type of centralized traffic control system, a pair of line wires connecting a control office to a plurality of field stations, power supply circuit means at said control office for energizing said line wires, means at each field station for selectively shunting said line wires to thereby cause a pulsating direct current in said line wires for the transmission of coded indications to said control office, said power supply circuit means supplying a controlled voltage to said line wires with varying level of direct current supplied to said line wires provided said direct current is below a preselected value, said power supply circuit means causing a decreasing voltage to be applied to said line wires in response to an increase of load tending to cause said line current to increase beyond a preselected value, said decreasing voltage characteristic being effective to limit said line current to substantially said preselected value with an increase of load to thereby prevent damage to apparatus at said control office.

References Cited in the file of this patent

UNITED STATES PATENTS

| | | |
|---|---|---|
| 2,399,734 | Hailes et al. | May 7, 1946 |
| 2,433,702 | Mayle | Dec. 30, 1947 |
| 2,624,039 | Jorgensen | Dec. 30, 1952 |
| 2,628,340 | Potter | Feb. 10, 1953 |